(12) United States Patent
Jähner et al.

(10) Patent No.: US 9,132,750 B2
(45) Date of Patent: Sep. 15, 2015

(54) LONGITUDINAL ADJUSTER FOR A VEHICLE SEAT

(75) Inventors: Falko Jähner, Kaiserslautern (DE); Hans Dropmann, Köln (DE)

(73) Assignee: KEIPER GmbH & Co. KG., Kaiserslautern (DE)

( * ) Notice: Subject to any disclaimer, the term of this patent is extended or adjusted under 35 U.S.C. 154(b) by 749 days.

(21) Appl. No.: 12/934,739

(22) PCT Filed: Oct. 15, 2009

(86) PCT No.: PCT/EP2009/007393
§ 371 (c)(1),
(2), (4) Date: Sep. 27, 2010

(87) PCT Pub. No.: WO2010/051903
PCT Pub. Date: May 14, 2010

(65) Prior Publication Data
US 2011/0012005 A1 Jan. 20, 2011

(30) Foreign Application Priority Data
Nov. 7, 2008 (DE) .................... 10 2008 056 683

(51) Int. Cl.
*B60N 2/08* (2006.01)

(52) U.S. Cl.
CPC ............ *B60N 2/0875* (2013.01); *B60N 2/0806* (2013.01); *B60N 2/0818* (2013.01)

(58) Field of Classification Search
USPC ......... 248/424, 429; 296/65.01, 65.11, 65.13, 296/65.14; 297/311, 312
See application file for complete search history.

(56) References Cited

U.S. PATENT DOCUMENTS

| | | | |
|---|---|---|---|
| 4,712,759 A | 12/1987 | Sugama et al. | |
| 5,961,088 A * | 10/1999 | Chabanne et al. | 248/429 |
| 6,648,292 B2 | 11/2003 | Flick et al. | |
| 6,843,532 B2 * | 1/2005 | Borbe et al. | 297/344.11 |
| 6,902,235 B2 * | 6/2005 | Rohee et al. | 297/334 |

(Continued)

FOREIGN PATENT DOCUMENTS

| | | |
|---|---|---|
| CN | 1392846 A | 1/2003 |
| CN | 1762736 A | 4/2006 |

(Continued)

Primary Examiner — Alfred J Wujciak
(74) Attorney, Agent, or Firm — McGlew and Tuttle, P.C.

(57) ABSTRACT

A longitudinal adjuster (3) for a vehicle seat (1), particularly a motor vehicle seat, has at least one first seat track (5) having catches (20) disposed in at least one row running in the longitudinal axis (x) of the seat. Each catch (20) includes a front flank (21a) and a rear flank (21a) in the longitudinal axis (x) of the seat, and at least one second seat track (8) that can be displaced relative to the first seat track (5) in the longitudinal axis (x) of the seat and locked to the same and at least two catch plates (12) for locking the first seat track (5) to the second seat track (8). The catch plates (12) are displaceably supported in the locking direction (z) in the second seat track (8) and comprise teeth (12b) for engaging in the catches (20) of the first seat track (5). Each tooth (12b) includes a front and a rear tooth flank (12d) in the longitudinal axis (x) of the seat. Each of the catch plates (12) includes exactly two teeth (12b) per associated row of catches (20). Two teeth (12b) belonging to different catch plates (12) act together with the row of catches (20) associated with said teeth (12b) for locking the first seat track (5) to the second seat track (8) with no clearance.

16 Claims, 3 Drawing Sheets

(56) References Cited

U.S. PATENT DOCUMENTS

| | | |
|---|---|---|
| 7,000,880 B2 * | 2/2006 | Jaudouin ............... 248/429 |
| 8,215,602 B2 * | 7/2012 | Walter et al. ........... 248/424 |
| 2002/0190182 A1 * | 12/2002 | Flick et al. ............. 248/430 |
| 2004/0108762 A1 | 6/2004 | Borbe et al. |
| 2008/0048087 A1 * | 2/2008 | Kojima et al. ........... 248/430 |
| 2011/0193389 A1 * | 8/2011 | Wojatzki et al. ......... 297/344.1 |

FOREIGN PATENT DOCUMENTS

| | | |
|---|---|---|
| DE | 100 50 959 | 5/2002 |
| DE | 102004051694 | 4/2006 |
| FR | 2 829 974 | 3/2003 |
| JP | 2004-511388 A | 4/2004 |
| JP | 2005-517567 A | 6/2005 |
| WO | 03/068553 A1 | 8/2003 |

* cited by examiner

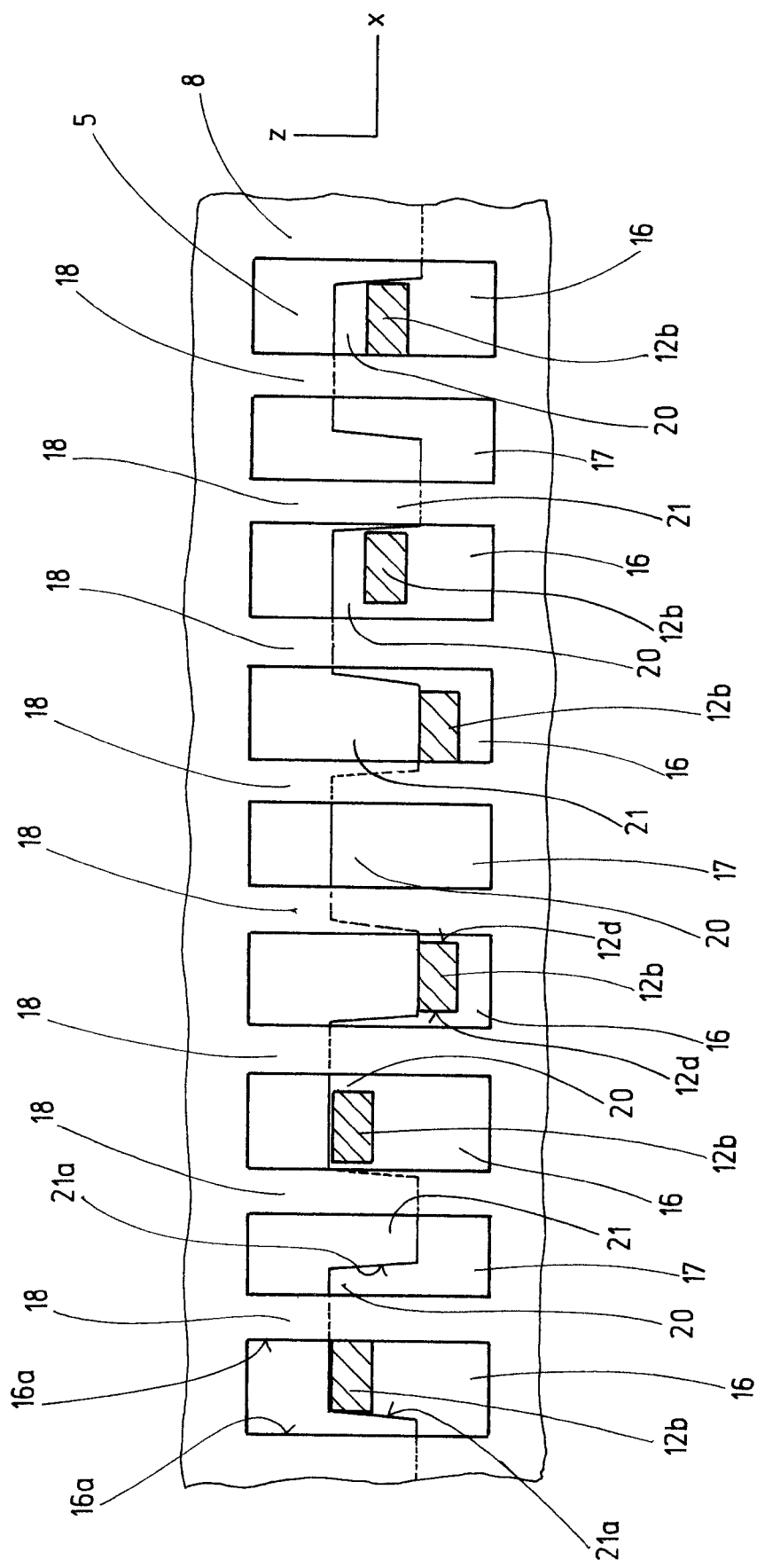

though the teeth of the detent plates and the recesses weaken the material between the slots. The distribution may be selected so that the webs between the slots and recesses all have the same width. Under load, therefore, all the webs are uniformly plasticized, so that in all situations a support of further teeth is possible.

LONGITUDINAL ADJUSTER FOR A VEHICLE SEAT

CROSS REFERENCE TO RELATED APPLICATIONS

This application is a United States National Phase application of International Application PCT/EP2009/007393 and claims the benefit of priority under 35 U.S.C. §119 of German Patent Application DE 10 2008 056 683.7 filed Nov. 7, 2008, the entire contents of which are incorporated herein by reference.

FIELD OF THE INVENTION

The invention relates to a longitudinal adjuster, for a vehicle seat, having at least one first seat track with detents which are arranged in at least one row extending in the longitudinal direction of the seat, each detent comprising a front flank and a rear flank in the longitudinal direction of the seat, at least one second seat track which is displaceable relative to the first seat track in the longitudinal direction of the seat and may be locked thereto and at least two detent plates for locking the first seat track to the second seat track, the detent plates being movably mounted in the locking direction (z) in the second seat track.

BACKGROUND OF THE INVENTION

A longitudinal adjuster of this type is disclosed in DE 100 50 959 B4, in which the first seat track has two opposing rows of detents and three detent plates are mounted in the second seat track. Each detent plate has on both longitudinal sides of the base body three teeth which protrude through slots of the second seat track and which may engage in the detents. In the normal case, locking without clearance is implemented by means of at least one of the detent plates. In the event of a crash, webs between the slots are deformed so that at least one further detent plate is effective above a specific load.

SUMMARY OF THE INVENTION

The object of the invention is to improve a longitudinal adjuster of the aforementioned type, in particular to reduce constructional space and weight.

According to the invention, a longitudinal adjuster for a vehicle seat, in particular a motor vehicle seat is provided with at least one first seat track with detents which are arranged in at least one row extending in the longitudinal direction of the seat. Each detent comprises a front flank and a rear flank in the longitudinal direction of the seat. At least one second seat track is displaceable relative to the first seat track in the longitudinal direction of the seat and may be locked thereto. At least two detent plates are provided for locking the first seat track to the second seat track. The detent plates are movably mounted in the locking direction in the second seat track and comprise teeth for engaging in the detents of the first seat track. Each tooth comprises a front and a rear tooth flank in the longitudinal direction of the seat. Each of the detent plates comprise exactly two teeth for each associated row of detents. Two teeth belonging to different detent plates cooperate with the row of detents associated with the teeth for locking the first seat track to the second seat track with no clearance.

Detent plates with only two teeth per row of detents (i.e. generally for each longitudinal side of the detent plates) make it possible to reduce the necessary overlapping region of the seat tracks (relative to longitudinal adjusters with detent plates with three teeth per longitudinal side) whereby the range of the adjustable longitudinal positions of the seat is increased (with the same length of the seat tracks). As different detent plates are responsible for the locking, it may be ensured that locking is possible without clearance in all longitudinal positions of the seat. This freedom from clearance is implemented by teeth of different detent plates, for which the distribution of the teeth and the detents is preferably selected to be variable.

A variable distribution of detents and teeth of the detent plates permits a specific design of the second seat track, which preferably comprises slots from which the teeth of the detent plates protrude, and recesses which specifically weaken the material between the slots. The distribution may be selected so that the webs between the slots and recesses all have the same width. Under load, therefore, all the webs are uniformly plasticized, so that in all situations a support of further teeth is possible.

The invention is described in more detail hereinafter with reference to an exemplary embodiment shown in the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a vertical sectional view through the exemplary embodiment in the x-z plane along the line I-I in FIG. 2;

DESCRIPTION OF THE PREFERRED EMBODIMENTS

Figure 3:
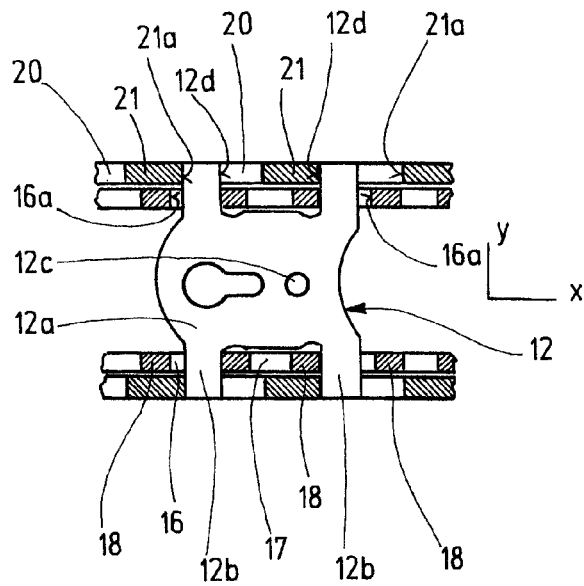
FIG. 3 is a horizontal sectional view through the exemplary embodiment along the line III-III in FIG. 2.
Figure 4:
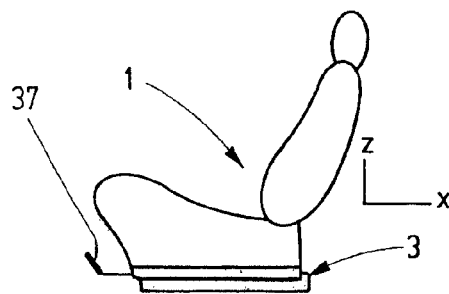
FIG. 4 is a schematic view of a vehicle seat according to the invention.
Figure 2:
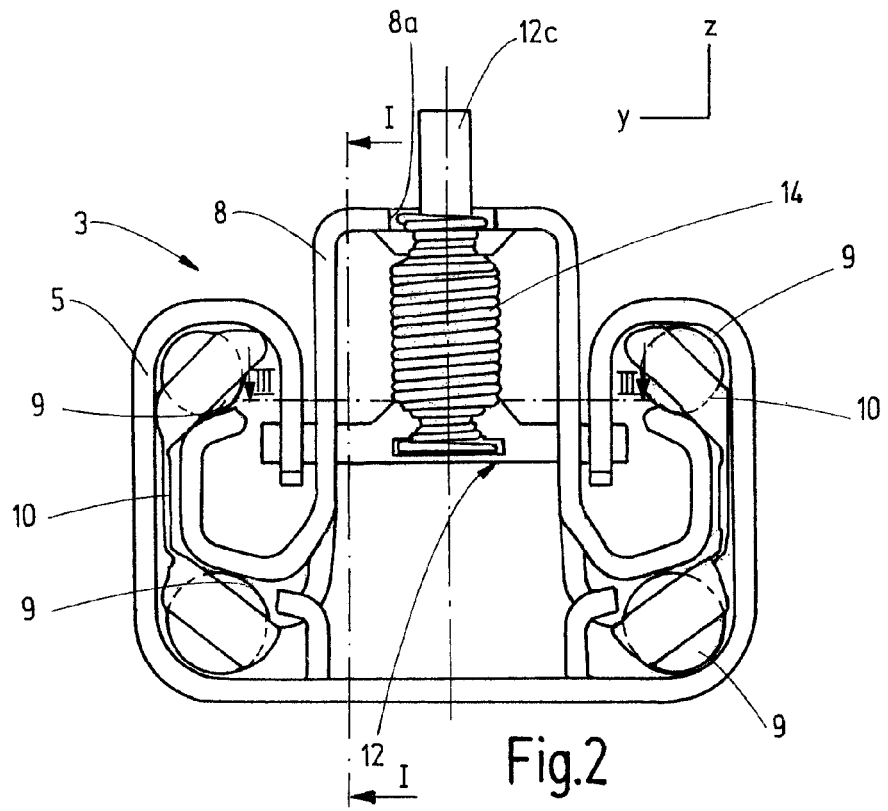
FIG. 2 is a vertical sectional view through the exemplary embodiment in the y-z plane.
Figure 5:
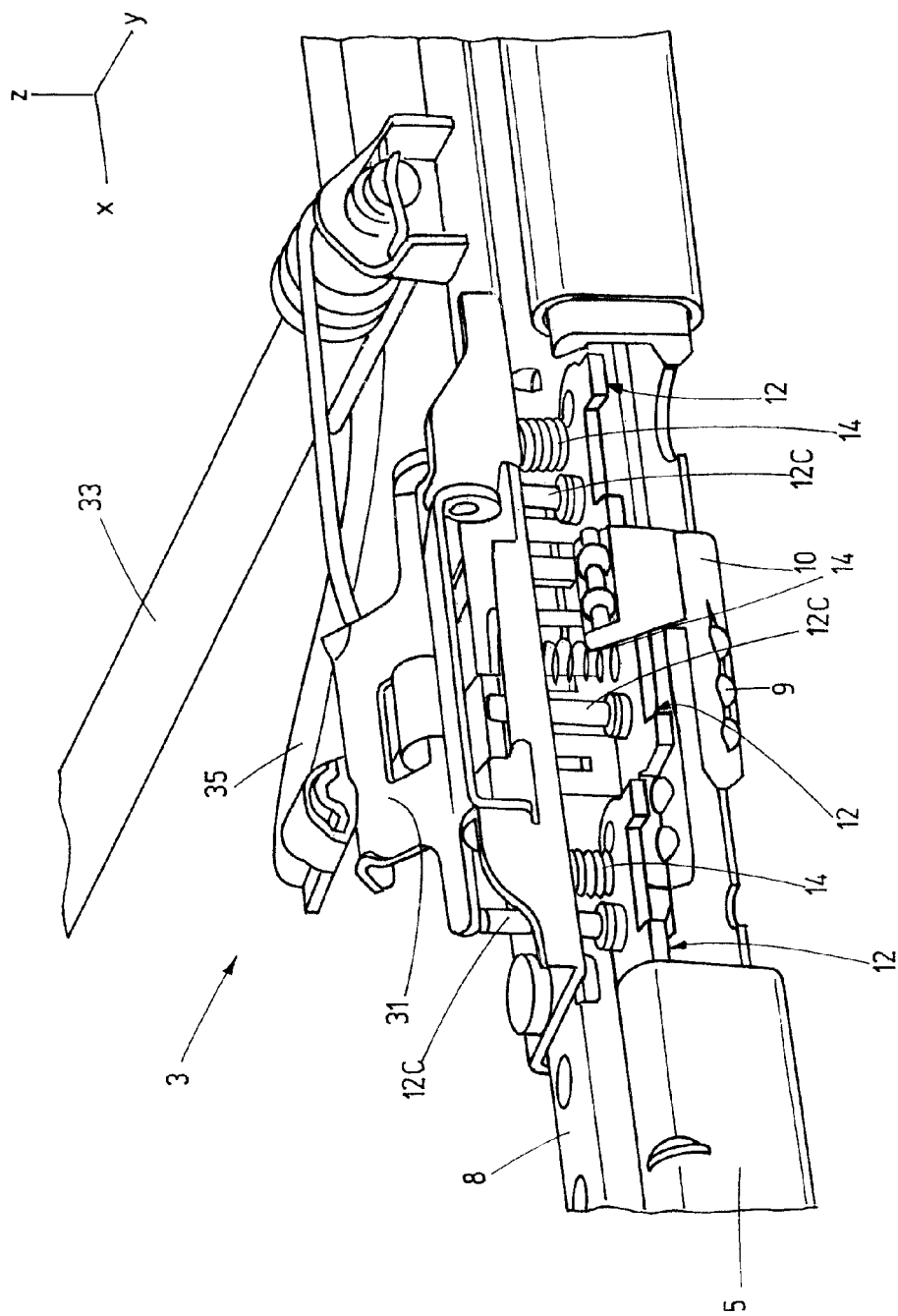
FIG. 5 is a partially sectioned, partial perspective view of the exemplary embodiment.

Referring to the drawings in particular, a vehicle seat 1 of a motor vehicle has a longitudinal adjuster 3, by means of which the vehicle seat 1 may be longitudinally adjusted, i.e. the longitudinal seat position thereof being able to be adjusted in the longitudinal direction of the seat x. The longitudinal direction of the seat x generally extends parallel to the direction of travel. The manually actuatable longitudinal adjuster 3 has on both vehicle seat sides one respective first seat track 5 which is connected to the vehicle structure of the motor vehicle, and one respective second seat track 8 which is displaceable relative to the associated first seat track 5 in the longitudinal direction of the seat x and which may be locked to said first seat track 5. In this case, the first seat track 5 and the second seat track 8 engage around one another with their substantially U-shaped profiles with longitudinal edges bent inwards and/or outwards by the interposition of balls 9. The balls 9 serve both for the mutual guidance and for the reduction of friction between the seat tracks 5 and 8. In the present exemplary embodiment, on each vehicle seat side in each of the four corners of the common track profile of the two metallic seat tracks 5 and 8, two respective sets of three balls 9 with specific spacings are arranged in succession in the longitudinal direction of the seat x, the metallic balls 9 being retained by a total of two ball cages 10 made of plastics material.

For locking the first seat track 5 and the second seat track 8, three detent plates 12 are provided on each vehicle seat side, said detent plates in each case being movably guided in the locking direction z in the second seat track 8, and being configured for cooperation with the first seat track 5. Each detent plate 12 has a planar base body 12a which extends in the longitudinal direction of the seat x and from which in each case on both longitudinal sides of the base body 12 exactly two teeth 12b protrude in a transverse direction y, i.e. a front tooth 12b in the longitudinal direction of the seat x and a rear tooth 12b in the longitudinal direction of the seat x. The guidance in the second seat track 8 takes place by means of a guide pin 12c which protrudes in the locking direction z from the base body 12a of the detent plate 12 and engages with clearance through a guide opening 8a in the second seat track 8, in the present case in the upper side thereof. The guide opening 8a is preferably formed with a slightly greater cross section than the guide pin 12c, in order to provide the possibility of compensating for clearance. A tension spring 14 which, on the one hand, is suspended on the associated detent plate 12 and, on the other hand, on the second seat track 8, pretensions the detent plate 12 in the locking direction z against the second seat track 8. The longitudinal direction of the seat x, the transverse direction y and the locking direction z which are located perpendicular to one another form a right-handed system. Each tooth 12b is profiled in the present case in a rectangular manner both in the x-z plane and in the x-y plane, all teeth having the same dimensions. Thus each tooth 12b—viewed in the longitudinal direction of the seat x—has a front tooth flank 12d and a rear tooth flank 12d.

The three detent plates 12 are arranged in succession in the longitudinal direction of the seat x with their base body 12a within the substantially U-shaped profile of the second seat track 8, all teeth 12b of the three detent plates 12 protruding through slots 16 in the side walls of the second seat track 8. Recesses 17 are provided to the side of the slots 16 in the side walls of the second seat track 8. The material region of the side wall between a slot 16 and a recess 17 or an adjacent slot 16 is denoted as a web 18. By means of the recesses 17, the material between the slots 16, i.e. the webs 18, is specifically weakened, as disclosed in DE 100 50 959 B4, the relevant disclosure thereof being expressly included in the invention. The slots 16 and the recesses 17 are of rectangular configuration, so that in each slot 16 the two adjacent webs 18 (and in the first and last slot 16 in the longitudinal direction of the seat, the side wall of the second seat track 8) form in each case an edge 16a extending in the locking direction z for defining the slots 16, i.e. a front edge 16a in the longitudinal direction of the seat x and a rear edge 16a in the longitudinal direction of the seat x.

The teeth 12b are provided for engaging in detents 20 of the first seat track 5, the detents 20 being separated by projections 21 of the first seat track 5. The projections 21 have two flanks 21a which define the detent 20 arranged therebetween in the longitudinal direction of the seat x, as a result of which a front flank 21a and a rear flank 21a are defined. By "projection" is intended to be understood the material part, and by "detent", the gap in the material. The detents 20 and projections 21 are arranged in at least one row extending in the longitudinal direction of the seat, generally in two opposing rows in the transverse direction y. In the present exemplary embodiment, the detents 20 are formed in the downwardly-bent regions of the longitudinal edges of the first seat track 5, i.e. the semi-open detents 20 open downwards, whilst the projections 21 protrude downwards in the manner of teeth. The projections 21 taper towards their free end (i.e. counter to the locking direction z). In the exemplary embodiment, the two flanks 21a of the projections 21 are inclined at an angle of $6°\pm2°$ to the locking direction z and thus merge with a radius in the bottom of the adjacent detent 20.

The dimensions i.e. widths and spacings of the teeth 12b, slots 16, recesses 17, webs 18, detents 20 and projections 21 are specifically selected in the longitudinal direction of the seat x. The slots 16 are wider than the teeth 12b (for example a quarter wider), the rear tooth flank 12d of the front tooth 12b of each detent plate 12 then coming to bear against the rear edge 16a of the associated slot 16 and the front tooth flank 12d of the rear tooth 12b coming to bear against the front edge 16a of the associated slot 16. The detent plate 12 is thus guided through the tooth flanks 12d facing one another. The webs 18 are all of the same width (for example half as wide as the slots 16), but may alternatively be different by up to three tenths. The recesses 17 are slightly narrower than the slots 16 (for example a tenth narrower). The detents 20 are wider than the teeth 12b (for example approximately twice as wide). The projections 21 are slightly wider than the teeth 12b (for example a fifth wider at the free end). The distribution of the detents 20, i.e. the spacing between two front flanks 21a (or two rear flanks 21b) is slightly smaller than the distribution of the teeth 12b, i.e. the spacing between the two front tooth flanks 12d (or the two rear tooth flanks 12d) of a detent plate 12 (for example one to two hundredths smaller, i.e. with conventional dimensions ca. 0.1 mm to 0.3 mm). In the present case, the distribution of the detents 20 is 15.0 mm, and the distribution of the teeth 12b is 15.2 mm.

The aforementioned dimensions are selected so that in each longitudinal seat position the locking takes place without clearance by means of two teeth 12b belonging to different detent plates 12 for each row of detents 20. In one of the two engaged detent plates 12, the front tooth 12b bears with its (rear) tooth flank 12d facing the rear tooth 12b of the same detent plate 12, against the (rear) edge 16a of the associated slot 16 and with the (front) tooth flank 12d remote therefrom against the (rear) flank 21a of the projection 21 in front of the relevant detent 20. In the other of the two engaged detent plates 12, the rear tooth 12b bears with its (front) tooth flank 12d facing the front tooth 12b of the same detent plate 12 against the (front) edge 16a of the associated slot 16 and with the (rear) tooth flank 12d remote therefrom against the (front) flank 21a of the projection 21 behind the relevant detent 20. In each case the bearing may take place in a punctiform or linear manner or over the entire surface. As a result of this state of the locked longitudinal adjuster 3 which is present in the normal case, both zero clearance and a quasi-stepless longitudinal adjustment are provided. The third detent plate 12 is located with its two teeth 12b on two projections 21. The longitudinal adjustment is only quasi-stepless, as in each longitudinal seat position one respective detent plate 12 may always be engaged, the second seat track 8 however exhibiting settling behavior, i.e. slightly moving during engagement until the second detent plate 12 is engaged.

In the event of a crash taking place in (or counter to) the longitudinal direction of the seat, the webs 18 are plastically deformed so that the teeth 12b of the two engaged detent plates 12 which have not participated hitherto, as well as of the third detent plate 12, come to bear against flanks 21a and/or edges 16a, as a result of which the entire longitudinal adjuster 3 is kept locked.

For unlocking the longitudinal adjuster 3, on each second seat track 8 are provided in a manner known per se a pivotably mounted unlocking flap 31 and between the two second seat tracks 8 a transverse tube 33 which is pivotably mounted and extends in the transverse direction y, with one respective arm 35 protruding to the rear on each vehicle seat side and with a lever 37 protruding to the front between the two vehicle seat sides, which is accessible at the front end of the vehicle seat 1 in the longitudinal direction of the seat. By pivoting the lever 37 upwards, the transverse tube 33 is rotated and pivots the two arms 35 downwards. Each arm 35 acts on the associated unlocking flap, which in turn acts on the guide pins 12c of the three associated detent plates 12, so that said detent plates are moved counter to the locking direction z and as a result leave the detents 20. The second seat tracks 8 may thus be displaced relative to one another.

While specific embodiments of the invention have been described in detail to illustrate the application of the principles of the invention, it will be understood that the invention may be embodied otherwise without departing from such principles.

The invention claimed is:

1. A longitudinal adjuster for a vehicle seat the longitudinal adjuster, comprising:
   a first seat track comprising projections, said projections defining detents, said projections and detents being arranged in at least one row extending in a longitudinal direction of the seat, each of said detents comprising a front flank and a rear flank in the longitudinal direction of the seat;
   a second seat track displaceable relative to the first seat track in the longitudinal direction of the seat, said second seat track comprising webs; and
   at least two detent plates locking the first seat track to the second seat track, the at least two detent plates being movably mounted in a locking direction in the second seat track and said at least two detent plates comprising teeth engaging in the detents of the first seat track, each of said teeth comprising a front and a rear tooth flank in the longitudinal direction of the seat, each of the detent plates comprising only two teeth for each associated row of detents, said at least two detent plates being arranged lengthwise relative to each other, said at least two detent plates being resiliently mounted against said second seat track with each of said at least two detent plates being at a different height in a vertical direction, said second seat track comprising slots, each of said slots receiving at least a portion of one of said teeth, said slots comprising a front edge and a rear edge in the longitudinal direction of the seat, each of said slots being defined by one of said webs and another one of said webs, said second seat track comprising recesses which are adjacent to the slots, one of said webs being provided between one of said slots and one of said recesses, each of said projections comprising a taper extending toward a free end thereof in a direction opposite said locking direction, wherein said first seat track is locked to said second seat track on one longitudinal side thereof via only one of said two teeth of one of said at least two detent plates and only one of said two teeth of another one of said at least two detent plates.

2. The longitudinal adjuster as claimed in claim 1, wherein in the longitudinal direction of the seat a distribution of the detents is less than a distribution of the teeth of each of the at least two detent plates.

3. The longitudinal adjuster as claimed in claim 2, wherein the distribution of the detents is one to two hundredths less than the distribution of the teeth.

4. The longitudinal adjuster as claimed in claim 1, wherein only one of said teeth of each of at least two detent plates locks said first seat track to said second seat track on one longitudinal side of said first seat track and said second seat track.

5. The longitudinal adjuster as claimed in claim 1, wherein said one of said two teeth of one of said at least two detent plates and said one of said two teeth of another one of said at least two detent plates lock said first seat track to said second seat track without clearance.

6. The longitudinal adjuster as claimed in claim 1, wherein the webs have the same width or a width of said webs differ from one another by up to three tenths.

7. The longitudinal adjuster as claimed in claim 1, wherein in the normal case one of the two teeth of one of the two engaged detent plates bears with its front tooth flank on the front edge of the associated slot and with its rear tooth flank on the rear flank of the cooperating detents.

8. The longitudinal adjuster as claimed in claim 7, wherein in the normal case one of the two teeth of the other of the two engaged detent plates bears with its rear tooth flank on the rear edge of the associated slot and with its front tooth flank on the front flank of the cooperating detents.

9. The longitudinal adjuster as claimed in claim 7, wherein in each case the other of the two teeth of the two engaged detent plates is spaced apart from the flanks and edges and thus in the normal case does not participate in the cooperation of the cooperating detents.

10. The longitudinal adjuster as claimed in claim 9, wherein, in the event of a crash, the webs are plastically deformed so that the teeth of the two engaged detent plates which have not participated in the cooperation of the cooperating detents, come to bear against flanks and/or edges.

11. The longitudinal adjuster as claimed in claim 1, wherein on each vehicle seat side, one respective first seat track and one respective second seat track are provided, each of the two second seat tracks bearing three detent plates.

12. The longitudinal adjuster as claimed in claim 11, wherein, in the event of a crash, the third detent plate engages in the first seat track.

13. A longitudinal adjuster for a vehicle seat the longitudinal adjuster, comprising:
   a first seat track comprising projections, said projections defining detents, said projections and detents being arranged in at least one row extending in a longitudinal direction of the seat, each of said detents comprising a front flank and a rear flank in the longitudinal direction of the seat;
   a second seat track displaceable relative to the first seat track in the longitudinal direction of the seat, said second seat track comprising webs; and
   at least two detent plates locking the first seat track to the second seat track, the at least two detent plates being movably mounted in a locking direction in the second seat track and comprising teeth engaging in the detents of the first seat track, each of said teeth comprising a front tooth flank and a rear tooth flank in the longitudinal direction of the seat, each of the detent plates comprising exactly two teeth for each associated row of detents, wherein each of said at least two detent plates has only four teeth, said at least two detent plates being arranged lengthwise relative to each other, said at least two detent plates being resiliently mounted against said second seat track, one of said at least two detent plates being at a first height with respect to the locking direction, another one of said at least two detent plates being at a second height with respect to the locking direction, said first height being different from said second height, said second seat track comprising slots, each of said slots receiving at least a portion of one of said teeth, said slots comprising a front edge and a rear edge in the longitudinal direction of the seat, each of said slots being defined by one of said webs and another one of said webs, said second seat track comprising recesses which are adjacent to the slots, one of said webs being provided between one of said slots and one of said recesses, wherein only one of said teeth of each of at least two detent plates locks said first seat track to said second seat track on one longitudinal side of said first seat track and said second seat track.

14. The longitudinal adjuster as claimed in claim 13, wherein each of said projections comprises a tapered surface and a free end surface, said tapered surface being integrally connected to said free end surface, said tapered surface extending in a direction opposite said locking direction.

15. The longitudinal adjuster as claimed in claim 14, wherein in the longitudinal direction of the seat a distribution of the detents is less than a distribution of the teeth of each of the at least two detent plates.

16. The longitudinal adjuster as claimed in claim 15, wherein the distribution of the detents is one to two hundredths less than the distribution of the teeth.

* * * * *